United States Patent
Quinn et al.

(10) Patent No.: US 6,864,888 B1
(45) Date of Patent: Mar. 8, 2005

(54) VARIABLE ACUITY RENDERING FOR A GRAPHIC IMAGE PROCESSING SYSTEM

(75) Inventors: Edward W. Quinn, Uniontown, OH (US); P. Pete Lutikoff, Wadsworth, OH (US)

(73) Assignee: Lockheed Martin Corporation, Akron, OH (US)

( * ) Notice: Subject to any disclaimer, the term of this patent is extended or adjusted under 35 U.S.C. 154(b) by 0 days.

(21) Appl. No.: 09/257,452

(22) Filed: Feb. 25, 1999

(51) Int. Cl.$^7$ .......................... G06T 15/60; G09G 5/00
(52) U.S. Cl. .................... 345/426; 345/611
(58) Field of Search ................ 345/611, 419, 345/629, 660, 865, 866, 426, 612, 613, 694

(56) References Cited

U.S. PATENT DOCUMENTS

| | | | | |
|---|---|---|---|---|
| 4,907,288 A | * | 3/1990 | Shimoni | 382/54 |
| 5,572,235 A | * | 11/1996 | Mical et al. | 345/600 |
| 5,867,166 A | * | 2/1999 | Myhrvold et al. | 463/33 |
| 6,234,901 B1 | * | 5/2001 | Nagoshi et al. | 463/33 |
| 6,426,750 B1 | * | 7/2002 | Hoppe | 345/428 |
| 6,456,339 B1 | * | 9/2002 | Surati et al. | 348/745 |
| 6,549,204 B1 | * | 4/2003 | Quinn | 345/428 |

* cited by examiner

Primary Examiner—Mark Zimmerman
Assistant Examiner—Scott Wallace
(74) Attorney, Agent, or Firm—Renner, Kenner, Greive, Bobak, Taylor & Weber

(57) ABSTRACT

Recognition of predetermined critical objects in a graphic display is enhanced by storing a plurality of object descriptions which are segmented into critical objects and background objects in an image database. The critical objects and the background objects are transferred to a computing engine which renders the critical objects and the background objects according to expert user recommendations. The critical objects are rendered separately with acuity enhancements to generate enhanced critical objects to greatly improve the realistic impression of the object in simulators. The background objects and the enhanced critical objects are then transferred into a memory buffer as a graphic image and it is then displayed at a single resolution.

16 Claims, 2 Drawing Sheets

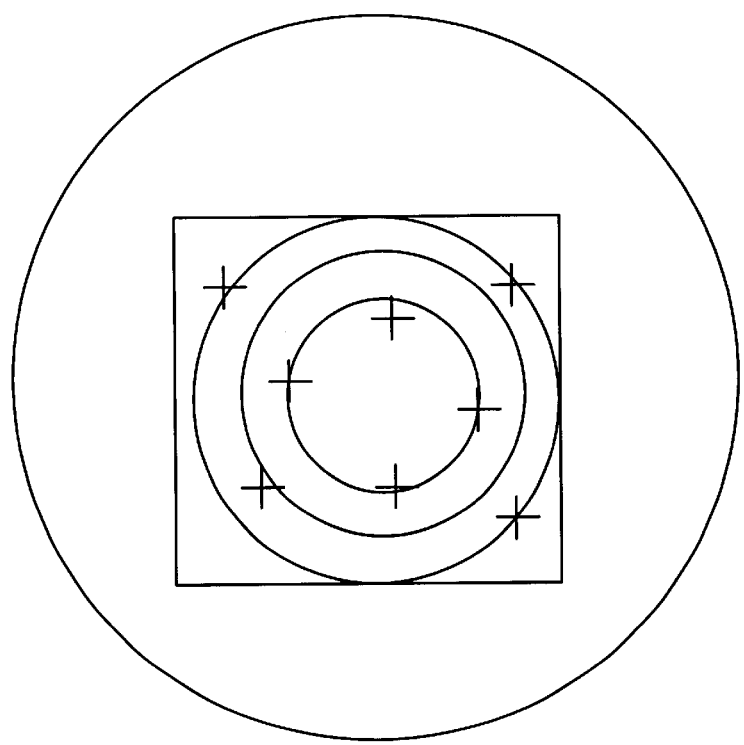
FIG-2A
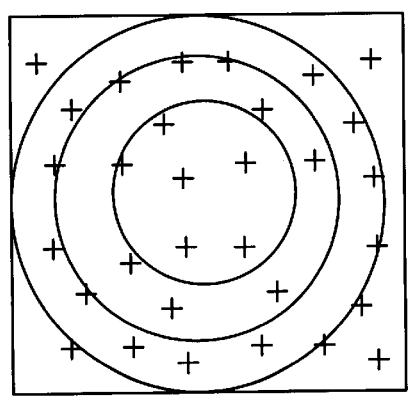   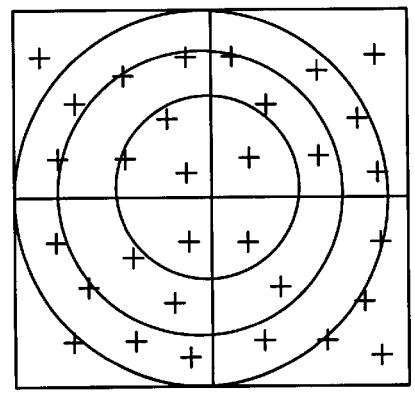
FIG-2B    FIG-2C

VARIABLE ACUITY RENDERING FOR A GRAPHIC IMAGE PROCESSING SYSTEM

TECHNICAL FIELD

The present invention relates to graphic image generation. In particular, the present invention relates to the generation of images for use in training simulators and the like. More specifically, the present invention relates to the generation of graphic images in which certain objects, whose area is a small percentage of the total image and yet of critical importance to the utility of the interactive graphic task being performed, are rendered with high acuity while surrounding elements in the graphic image scene are generated in their normal manner.

BACKGROUND ART

High quality graphic image generation is used in various fields such as flight simulators, medical training and surgery, computer games, and engineering workstations, to name a few. It is imperative that these systems provide realistic images for the benefit of the user. These images should have as a minimum sufficient quality to correspond to the visual scene experienced by the user in viewing the objects directly with either optically aided or non-aided vision. The overall objective is to facilitate the teaching or game playing environment for the benefit of the user. The system goal therefore is to provide an immersive environment which is perceived by the user to be very like the visual appearance of the task as it would be performed in the real world.

To this end, it is desired to provide systems which do not create false impressions with unrealistic or inaccurate object representations. For example, flight simulators are employed to train fighter pilots on how to quickly detect objects such as enemy planes and missiles. The pilot does this by scanning the horizon in a predetermined pattern along with other visual and auditory warnings. As such, if the flight simulator renders an object with a fluttering appearance or an unrealistic large size, a false impression of the target is generated. As such, the training exercise is detrimental in that the actual appearance of an enemy plane or target is unrealistic. Hence the visual expectations of the pilot in air combat become unrealistic and life threatening. Similar limitations exist for medical training and surgery preparation/execution and other similar applications. Hence accepted practice is to overcome this very serious limitation by resorting to alternate—and generally more expensive—means of accomplishing the objective. As an example, after training in a simulator, the pilot must spend a large number of hours in the aircraft to become familiarized with the appearance of aircraft and missiles in the real world.

Attempts at improving graphic image processors used with simulators and other interactive graphics devices continue due to the desire to improve the quality of displays. These are limited by the pace of advancements in computer and display technology.

In general, it is known to apply improved rendering techniques to an entire image display to enhance the overall appearance of the images presented. However, this approach rapidly consumes processing power available and accordingly, limits other operational aspects of the image processor such as real-time presentation of the total visual environment. Moreover, current technology graphic processors using embedded graphic algorithms are unable to selectively improve the visual appearance of those items whose detail is particularly important and critical to the overall success of the training simulation. This is exemplified by the aforementioned planes and missiles that require high acuity presentation in order to assure that the pilot is being trained in an environment as similar as possible to the visual environment likely to be encountered in actual air combat.

The present processing equipment does not prioritize these objects and accordingly, processes the important items as it would any background information. This limits the usefulness of the training or display environment.

One alternative to the aforementioned approach is to employ high acuity projectors in conjunction with a graphic image processor. This technique generates a simulated background scene and superimposes the critical images onto the scene with a higher resolution. This requires additional processing equipment and is quite expensive. Moreover, the high resolution projectors of today are unable to represent the critical objects with the acuity and real world appearance necessary for effective training or practice.

An extension of this approach is to provide a hardware-based solution utilizing high resolution Area of Interest displays. In conjunction with this, a mechanism is provided for tracking pilot head position and those areas where the pilot is perceived to be looking are processed with high resolution. Unfortunately, this method employs unrealistic background scenes which appear artificial and do not present an accurate representation for a training simulator. Hence the lower detail background image appears to the pilot undergoing training to be quite different than the remainder of the visual scene. This provides the pilot with a visual cue not available in air combat and lessens the pilots ability to perform air combat maneuvers effectively.

The current preferred system for generating graphic images for simulators is to provide an image database that is accessed by a graphic computing engine. Depending upon input from the trainee, images are rendered to a memory buffer and then displayed at about 60 frames per second. One enhancement to this current technology is to render the critical objects, such as enemy airplanes, in a separate memory buffer which is then transferred to the main memory buffer for display. Although an improvement, a high resolution display of about 5,000×4,000 pixel screen density is required to properly display the critical objects. This approach is still quite costly as it still requires the use of laser projectors which are not currently available and whose cost is likely to be very prohibitive upon the initial introduction of this improved technology.

Based upon the foregoing, it is evident that there is a need for a graphic image processor system which displays critical objects with an enhanced acuity while using available graphics processing power to display the entire scene at the same resolution. The availability of this capability would markedly improve human performance in real world visual tasks for which extensive training is currently the norm.

DISCLOSURE OF INVENTION

In light of the foregoing, it is a first aspect of the present invention to provide a variable acuity rendering for graphic image processing.

Another aspect of the present invention is to provide the graphic image processing system with a segmented image database. This segmentation allows critical objects and background objects to be separately stored. The critical objects are of a limited area and important nature that their accurate rendering is of utmost importance to the simulation or training exercise.

Still a further aspect of the present invention is to enhance current graphic image processing systems, as above, to allow a graphic computing engine to render critical objects and background objects separately.

Yet another aspect of the present invention is to provide a graphics image processing system, as above, in which the computing engine applies various enhancement techniques such as anti-aliasing, KEL factor adjustment, which is a standard measure of display performance in which the goal of this technique is to overcome display system contrast degradation for small objects, enhanced reflection models and the like to the critical objects to enhance their acuity.

Still another aspect of the present invention is to provide a graphics image processing system, as set forth above, in which the critical objects and the background objects are sent to the same image memory buffer.

A further aspect of the present invention is to provide a graphic image processing system, as above, wherein the critical objects and background objects are transferred from the image memory buffer to a display that shows the critical objects and the background objects at the same resolution, but with enhanced rendering of the critical objects to markedly improve the utility of the graphic image display.

The foregoing and other objects of the present invention, which shall become apparent as the detailed description proceeds, are achieved by a method of enhancing recognition of predetermined objects in a graphic display, comprising the steps of storing a segmented plurality of object descriptions in an image database. This database is explicitly segmented into critical objects and background objects either by actual partitioning of the database or in terms of the graphic processor carrying the identification of critical objects so that when they are encountered they are processed separately. The second step is to transfer critical objects and background objects separately to a computing engine. Then different algorithms render critical objects versus background objects. The design of the rendering process is determined according to expert user input in which the important aspects of a particular object are delineated as a function of range. These critical objects are rendered separately with acuity enhancements to generate visually enhanced objects, loading the background objects and the enhanced critical objects into a memory buffer as a graphic image, and displaying the graphic image.

Still another aspect of the present invention is provided by a computer-readable medium which makes possible implementing variable acuity algorithms for enhancing the appearance of an object appearing in a computer generated image, comprising means for storing a plurality of background object descriptions and a plurality of critical object descriptions, means for separately rendering the plurality of background and critical object descriptions, wherein acuity enhancements are applied to the critical object descriptions to generate a plurality of enhanced critical objects, and means for displaying the enhanced critical objects and the background object descriptions on a graphic image display at the same resolution.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein:

FIG. 2 is a schematic representation of an anti-aliasing employed by the graphic image processor to enhance the acuity of critical objects.

BEST MODE FOR CARRYING OUT THE INVENTION

Figure 1:
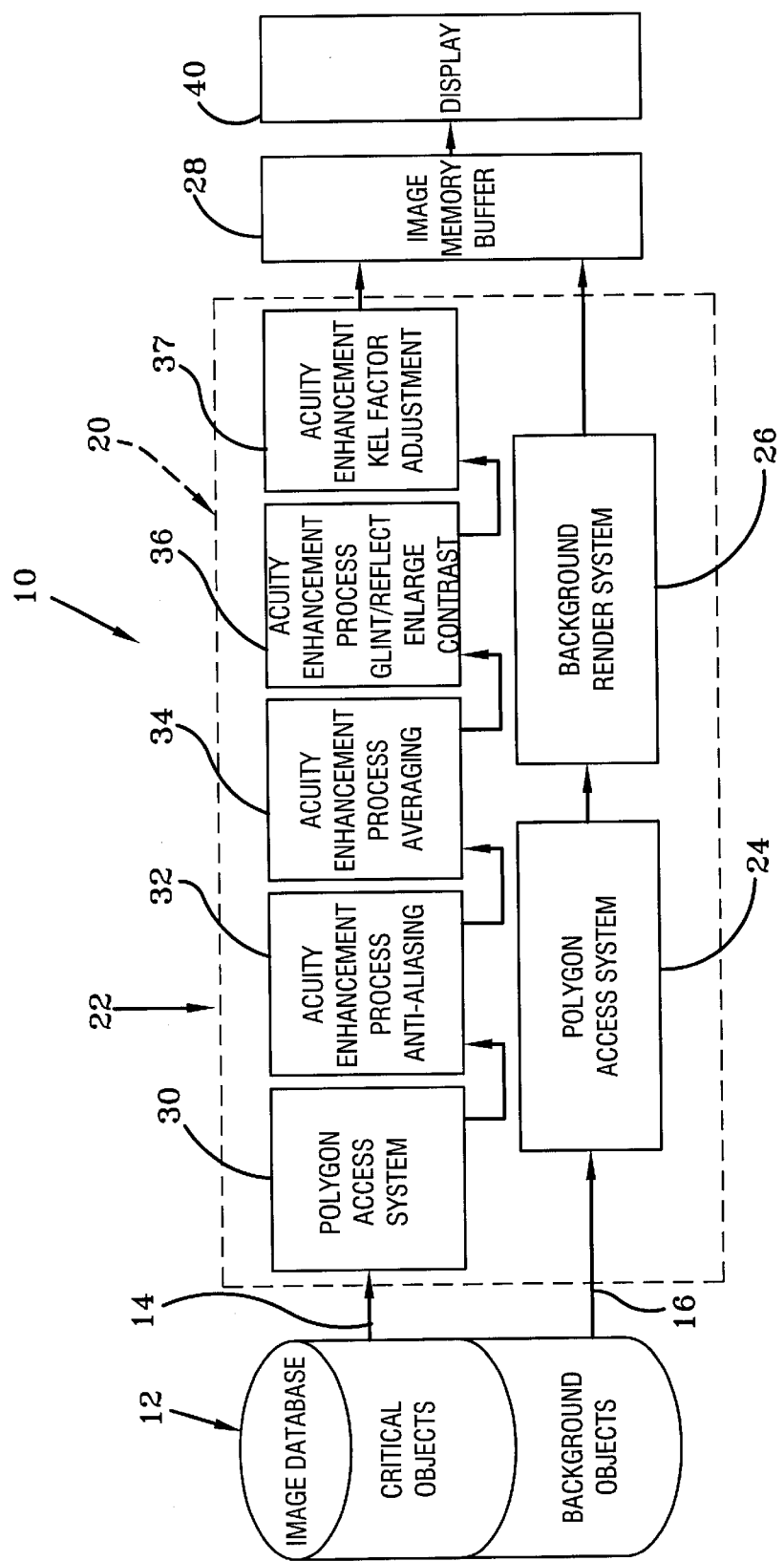
FIG. 1 is a schematic block diagram of the present invention.

Referring now to the drawings, and in particular, to FIG. 1, it can be seen that a graphic image processing system, according to the present invention, is designated generally by the numeral 10. Generally, the system 10 provides a computer processing system specifically designed for displaying graphic images. A current example of such a system is the Silicon Graphics Infinite Reality Engine. The system configuration is general in that it includes the necessary hardware, software, and memory required for operation of high-end graphic processing systems that are used for computer games, personal computers, medical training simulators, engineering graphic workstations, flight simulators, and the like. In the present instance, the system 10 is configured to visually generate those objects of critical importance to a simulation or any object in a scene that requires enhanced acuity to allow the user to be trained effectively.

The system 10 includes an image database 12 where digital descriptive data for various objects are stored. This data includes such things as object shape, color, reflective characteristics, texture type, and overlaid texture imagery, and other scene descriptive data. As such, each image database entity that is presented to the graphic display must include number of objects. Each object is stored in the image database 12.

The image database structure for each object consists of polygonal boundaries, such as triangular lines, rectangular lines, or other similar geometric shapes. These shapes are then linked together in a graphic data structure. At the outset, the system 10 distinguishes the objects within the database 12 between critical objects 14 and background objects 16. Background objects 16 are identified as those things which are determined to be of normal importance such as rivers, roads, cities, clouds, sky conditions, and other aspects of a scene adequately rendered by a normal graphics image processing system. The critical objects 14, which in this instance are identified as targets, enemy planes, missiles, or any other item whose visual detail is critically important to the training of a fighter pilot, surgeon or other user application. To make the point clear, in other environments, such as medical simulation, the item of critical importance may be a medical instrument, a tumor, or diseased tissue.

A computing engine 20 accesses the image database 12 to generate the pictorial information for later viewing. To implement this, an application engineer receives expert user or other input to properly define the unique objects contained in the image database 12. The application engineer then implements the critical object vs. background object segmentation of the image data base. After consideration of the graphic engine and display characteristics, the necessary acuity enhancement algorithms are implemented within the graphic engine. In a flight simulator, the pilot will most likely control a joystick and have control over other elements within the simulator environment. Pilot actions and other outside contributions to the display appearance are identified as input 22. Control of these elements is input to the computing engine 20 and directly affects how the objects 14 and 16 are presented in the final display.

For background objects 16, the computing engine 20 employs an object polygon access system 24 which retrieves the background objects 16 from the image database 12 and transfers them to a rendering system 26. System 26 sequentially steps through each of the polygon object elements, and accurately represents their appearance at a moment in time. The engine 20 then transfers these polygons, as represented by any number of pixels, to an image memory buffer 28.

Concurrent with the rendering of the background objects 16, the computing engine 20 renders the critical objects 14 in a somewhat similar manner. In particular, an object polygon access system 30 retrieves the critical objects 14 from the image database 12. At this time, a plurality of different acuity enhancements 32–37 are employed to enhance the appearance of critical objects so that they are as realistic as possible for the training exercise. These acuity enhancements will be discussed in detail further below. Upon completion of the acuity enhancements 32–37 the critical objects are transferred to the image memory buffer 28 and combined with the background objects previously rendered. A single frame of the image memory buffer 28 is then transferred to a display 40 at a single resolution.

The sequential processing of all of the objects, both critical and background, is then repeated. In other words, when a next picture, which may be slightly different due to changes in the scene content is complete, it is then also transferred to the display 40 at a rate of about 60 frames per second. The scene content changes can be caused by a change in the position of the pilot's eye point from which the objects are being viewed, changes in the object positions themselves, changes in environmental conditions such as sun position or other similar changes as provided by input 22. The generation of the sequence of pictures corresponds to a realtime sequence similar to that of a motion picture. Accordingly, the scene displayed by display 40 appears to be a continuous view of the objects from the pilot's eye point.

By splitting the critical objects and the background objects in the image database and rendering them separately, enhancements may then be applied to those critical objects. As such, the rendering process can be optimized in such a manner that the capability and functioning of the human visual system which recognizes these objects is likewise optimized without an inordinate increase in processing power.

Acuity enhancement process 32 may include anti-aliasing techniques or other algorithms having a similar enhancement capability. Note that the anti-aliasing technique is but one of many means of achieving enhanced acuity rendition. The selection of a particular method is best performed when knowledge of the graphic computing engine detailed computing performance is available. The algorithm selected is based on the best implementation for that particular device. In the present instance, when the critical objects 14 are identified, the acuity enhancement process 32 identifies the object as a predetermined block of n×m pixels. Each of these pixels is then subdivided into a predetermined number of sub-pixels such as 8×8. If the object covers a portion of the sub-pixel, a weight value for that sub-pixel is assigned. These weighted values are then averaged or otherwise analyzed such as with a Poisson distribution in order to further refine and smooth the anti-aliasing function. For example, as seen in FIG. 2A, for an ideal sphere which is at 2 arc-minutes at 4,000 foot range, that is the largest diameter sphere, 8 hash marks or subsamples for a single pixel are taken. As the target is pushed further out in the range (the sphere becomes progressively smaller), the match of the target to the pixel contrast for the various displays can be evaluated. At the 8,000 foot range, seven of the eight subsamples are covered, which results in a calculated coverage value of about 88%, when in actuality, coverage should be about 78%. As such, the calculated intensity value is off by as much as 10%. These intensity values are further distorted as the sphere appears further downrange.

TABLE 1

| Target Range | Size | Actual | Contrast 2 Arc/Min./ Pixel 8 Subsamples | 2 Arc/Min./ Pixel 32 Subsamples | 1 Arc/Min./ Pixel 8 Subsamples |
| --- | --- | --- | --- | --- | --- |
| 4,000 Ft | 4 | 100% | 100% | 100% | 100% |
| 8,000 Ft | 2 | 78% | 88% | 84% | 84% |
| 12,000 Ft | 1.33 | 34% | 50% | 44% | 44% |
| 16,000 Ft | 1 | 19% | 38% | 19% | 19% |

As can be seen from the above table and FIGS. 2B and 2C, the human eye will receive improved image discrimination ability using the increased sampling rate of 32 subsamples, this more closely matches the contrast characteristics of the real-world (the column labeled "actual"), by using improved image anti-aliasing. It is evident that this mechanism provides the ability for a pilot or trainee to recognize visual contrast characteristics that indicate position and orientation changes. This results in realistic contrast changes within the visual field. By employing such an anti-aliasing technique, the shape and range information of a critical object is greatly enhanced. As such, flickering between adjacent pixels is virtually eliminated so that the appearance of an object is not over exaggerated during rendering.

When such a technique is applied with a Silicon Graphics Infinite Reality Engine, the block of pixels surrounding the critical object is first rendered at a high resolution wherein twice as many points and twice as many lines are generated. This is then transferred to an image buffer, whereupon a bilinear interpolation is performed to reduce the critical object back to a factor of the original resolution. The critical object is then inserted into the image memory buffer 28 for display at a single resolution. Of course, anti-aliasing can be applied to the block of predetermined pixels surrounding any critical object by other types of graphics processing systems.

Computing engine 20 may perform just one acuity enhancement or a multiple number of acuity enhancements to the critical objects. As such, an averaging acuity enhancement process 34 may be applied to the critical objects. For example, the values associated with each pixel and/or the sub-pixels in the block of pixels may be mathematically averaged to cut down on the size of the information to be displayed, given an appropriate weight and then rendered to the image memory buffer 28. A similar result may be implemented by a slight increase in object size as a function of range in order to restore the contrast observed in the real world as opposed to the contrast reduction in the display induced by display resolution limitations. In this case it is necessary to carefully consider the instant display and graphic engine since the restoration of real world realism process must be crafted with these in mind. Other acuity enhancement applications of size modification are discussed below.

Another acuity enhancement process 36 may account for the glint of a critical object. In the present instance, glint refers to the reflections from an aircraft canopy. The glint is calculated based upon the range and aspect of the identified aircraft. As such, if an aircraft turns in a particular angle and it is calculated that sunlight reflects off that angle, the enhancement process can calculate when a reflection may occur and includes the reflection in the rendering of the critical object.

Yet another variation on such an acuity enhancement is that the critical object, although small, may be enlarged to assist a beginner trainee in identifying a critical object. As the trainee develops an expertise, the enhancement may be reduced so that it becomes more like real-world scenarios. A similar effect may be gained by contrast enhancement of the critical object.

Still yet another acuity enhancement process 37 may compensate a KEL factor of a display. As is well known in the art, the KEL factor is associated with the modulation transfer function of the display. In other words, each particular display generates a pixel in such a manner that it is somewhat reduced due to inadvertent illumination of the adjacent pixels when the subject pixel is illuminated. Other limitations are attributable to the electronics of the processing system and the display. These limitations effectively reduce the displayable resolution of the pixels by a certain percentage. Accordingly, if an object is smaller than a pixel, the intensity of that particular pixel is reduced and the object is out of sight when in fact it should be visible on the display. For example, if the KEL factor is 0.7, an object that in reality fits in one pixel square will have an intensity 70% of what it should.

Another way to compensate for the KEL factor is to determine the actual range of the critical object. Because of the KEL factor, the critical object will not appear on the display as soon as it would in actuality. To compensate for the apparent size reduction, the range value of the critical object is adjusted to accommodate the KEL factor. As such, the object will appear visible at about the point in time which it would in reality. This KEL factor adjustment can be effectively reduced as the object appears closer and closer to the eye point of the user.

Other critical acuity enhancements may be added to the critical objects to allow the target intensity profile across the pixels to vary much more realistically as a function of range and aspect angle. This is all done so that the human eye may distinguish the small intensity changes in the pixel comprising the image to a much greater degree due to the larger number of intensities available and a corresponding reduction in pixel noise. Those skilled in the art will appreciate that other types of acuity enhancements may be employed. These enhancements include, but are not limited to, re-scaling the image, wherein interpolation allows the contribution of adjacent pixels to be used in a similar manner; convolution filtering; Fast Fourier transform analysis of the pixels; high frequency clipping, and re-transformation. Other techniques also include time averaging the image in the image generator wherein several frames are collected in the image buffer and then sent to the display, or time averaging the image in the monitor wherein long persistence phosphors of the pixel display are analyzed.

Thus, it can be seen that the objects of the invention have been obtained by the structure and methodology presented above. While in accordance with the Patent Statutes, only the best mode and preferred embodiment of the present invention has been presented and described in detail, it is to be understood that the invention is not limited thereto or thereby. Accordingly, for an appreciation of true scope and breadth of the invention, reference should be made to the following claims.

What is claimed is:

1. A method of enhancing recognition of predetermined objects in a graphic display, comprising the steps of:

storing a plurality of object descriptions in an image database which is permanently segmented into critical objects and background objects;

transferring said critical objects and said background objects to a computing engine;

rendering said critical objects and said background objects according to user input by said computing engine, wherein said critical objects, but not said background objects, are rendered separately with acuity enhancements to generate enhanced critical objects;

loading said background objects and said enhanced critical objects without further rendering into a memory buffer as a single graphic image, wherein said step of rendering said critical objects includes the steps of:

identifying a location of said critical objects with respect to said background objects, wherein said critical object location is defined by a block of pixels;

subdividing said block of pixels into a predetermined number of sub-pixels;

predetermining reflective characteristics of said critical object and storing said characteristics in said image database; and incorporating said reflective characteristics into rendering of said sub-pixels to enhance the acuity of said critical objects for inclusion in said graphic image; and displaying said graphic image.

2. The method according to claim 1, wherein said step of displaying includes the step of displaying said graphic image at a single resolution on a display of insufficient resolution to provide acuity to said enhanced critical objects.

3. The method according to claim 1, wherein said step of loading includes the step of loading said background objects and said critical objects at the same resolution.

4. The method according to claim 1, wherein said step of rendering said critical objects further includes the steps of:

rendering said block of pixels at two times the rendering of said background objects; and applying bilinear interpolation to said block of pixels to enhance the acuity of said critical objects for inclusion in said graphic image.

5. The method according to claim 1, wherein said step of rendering said critical objects further includes the steps of:

rendering said block of pixels at at least two times the rendering of said background objects;

assigning values to said rendered block of pixels; and averaging said values and reassigning said average values to said block of pixels to enhance the acuity of said critical objects for inclusion in said graphic image.

6. The method according to claim 1, wherein said step of rendering said critical objects further includes the steps of:

enlarging said critical object within its respective block of pixels for the training benefit of the person viewing said graphic image.

7. A method of enhancing recognition of predetermined objects in a graphic display, comprising the steps of:

storing a plurality of object descriptions in an image database which is permanently segmented into critical objects and background objects;

transferring said critical objects and said background objects to a computing engine;

rendering said critical objects and said background objects according to user input by said computing engine, wherein said critical objects, but not said background objects, are rendered separately with acuity enhancements to generate enhanced critical objects;

loading said background objects and said enhanced critical objects without further rendering into a memory buffer as a single graphic image;

displaying said graphic image; and wherein said step of rendering said critical objects includes the steps of:

identifying a location of said critical objects with respect to said background objects, wherein said location is defined by a block of pixels; and selectively compensating the intensity of said plurality of object descriptions according to a KEL factor of a graphic image display displaying said graphic image; and wherein said step of selectively compensating includes the steps of:

determining a range of said critical objects as they appear on said graphic image display; and adjusting said size of said critical objects at the same range according to said KEL factor.

8. The method according to claim 7, wherein said step of compensating includes the steps of:

measuring the intensity of said critical objects;

measuring the intensity of said background objects; and compensating the intensity of said critical objects according to the said KEL factor.

9. The method according to claim 7, wherein said step of compensating includes the steps of:

determining a range of said critical objects as they appear on said graphic image display; and adjusting said range of said critical objects according to said KEL factor.

10. A computer-readable medium for enhancing the appearance of an object appearing in a computer generated image, comprising:

means for storing a plurality of background object descriptions and a plurality of critical object descriptions;

means for separately rendering said plurality of background and critical object descriptions, wherein acuity enhancements are applied to said critical object descriptions, but not to said background object descriptions, to generate a plurality of enhanced critical objects;

means for combining said enhanced critical objects and said background object descriptions in a single graphic image at the same resolution;

means for receiving user input into said means for separately rendering to alter the appearance of said graphic image display;

means for identifying where said enhanced critical objects are located with respect to said background object descriptions;

means for associating a block of pixels around said critical object descriptions wherein said acuity enhancements are applied to said block of pixels;

means for sub-dividing said block of pixels into a predetermined number of sub-pixels;

means for predetermining reflective characteristics of said critical object and storing said characteristics in said image database; and means for incorporating said reflective characteristics into rendering of said sub-pixels to enhance the acuity of said critical objects for inclusion in said graphic image.

11. The computer-readable medium according to claim 10, further comprising:

means for rendering said block of pixels at two times the rendering of said background objects; and means for applying bilinear interpolation to said block of pixels to enhance the acuity of said critical objects for inclusion in said graphic image.

12. The computer-readable medium according to claim 10, further comprising:

means for rendering said block of pixels at at least two times the rendering of said background objects;

means for assigning values to said rendered block of pixels; and means for averaging said values and reassigning said average values to said block of pixels to enhance the acuity of said critical objects for inclusion in said graphic image.

13. The computer-readable medium according to claim 10, further comprising:

means for enlarging said critical object within its respective block of pixels for the training benefit of the person viewing said graphic image.

14. A computer-readable medium for enhancing the appearance of an object appearing in a computer generated image, comprising:

means for storing a plurality of background object descriptions and a plurality of critical object descriptions;

means for separately rendering said plurality of background and critical object descriptions, wherein acuity enhancements are applied to said critical object descriptions, but not to said background object descriptions, to generate a plurality of enhanced critical objects;

means for combining said enhanced critical objects and said background object descriptions in a single graphic image at the same resolution;

means for receiving user input into said means for separately rendering to alter the appearance of said graphic image display;

means for identifying where said enhanced critical objects are located with respect to said background object descriptions;

means for associating a block of pixels around said critical object descriptions wherein said acuity enhancements are applied to said block of pixels;

means for selectively compensating the intensity of said plurality of object descriptions according to a KEL factor of a graphic image display displaying said graphic image;

means for determining a range of said critical objects as they appear on said graphic image display; and means for adjusting said size of said critical objects at the same range according to said KEL factor.

15. The computer-readable medium according to claim 14, further comprising:

means for measuring the intensity of said critical objects;

means for measuring the intensity of said background objects; and means for compensating the intensity of said critical objects according to the said KEL factor.

16. The computer-readable medium according to claim 14, further comprising:

means for determining a range of said critical objects as they appear on said graphic image display; and means for adjusting said range of said critical objects according to said KEL factor.

* * * * *